(12) United States Patent
Asaoka

(10) Patent No.: US 8,790,103 B2
(45) Date of Patent: Jul. 29, 2014

(54) SCREW MOUNTING STRUCTURE OF AN INJECTION MOLDING MACHINE

(75) Inventor: Hiroyasu Asaoka, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 17 days.

(21) Appl. No.: 13/549,434

(22) Filed: Jul. 14, 2012

(65) Prior Publication Data

US 2013/0101692 A1    Apr. 25, 2013

(30) Foreign Application Priority Data

Oct. 19, 2011   (JP) ................................. 2011-229610

(51) Int. Cl.
*B29C 45/77*    (2006.01)

(52) U.S. Cl.
USPC .......................................... 425/145; 425/190

(58) Field of Classification Search
USPC ...................... 425/145, 185, 190, 192 R, 587
See application file for complete search history.

(56) References Cited

U.S. PATENT DOCUMENTS

| 5,011,396 A | 4/1991 | Cosman et al. |
| 5,344,303 A | 9/1994 | Takatsugi et al. |

FOREIGN PATENT DOCUMENTS

| CN | 201427382 Y | 3/2010 |
| DE | 3637897 A1 | 5/1988 |
| DE | 4223489 A1 | 1/1994 |
| DE | 69106194 T2 | 6/1995 |
| JP | 603013 U | 1/1985 |
| JP | 60157214 U | 10/1985 |
| JP | 5131511 A | 5/1993 |
| JP | 6055593 A | 3/1994 |
| JP | 7-42689 | * 8/1995 |
| JP | 7042689 U | 8/1995 |
| JP | 8-118438 | * 5/1996 |
| JP | 8118438 A | 5/1996 |

OTHER PUBLICATIONS

Office Action Issued on Dec. 4, 2012 by the Japanese Patent Office in corresponding Japanese Application No. 2011-229610, with English translation.
Office Action dated Feb. 20, 2014 corresponds to German patent application No. 102012020110.9.
Office Action issued Apr. 1, 2014, corresponds to Chinese patent application No. 201210397281.

* cited by examiner

*Primary Examiner* — Tim Heitbrink
(74) *Attorney, Agent, or Firm* — Lowe Hauptman & Ham, LLP

(57) ABSTRACT

In a screw mounting structure of an injection molding machine in which a screw is fixed to a screw driving portion which transmits a rotating force and forward and backward thrusts to the screw, a fixing bushing for restricting movement of the screw in a rotating direction is fixed to the screw driving portion. A guide groove is formed in the fixing bushing in a direction orthogonal to a rotary axis of the screw, and retainers slide along the guide groove and are engaged with an engaging groove in a base portion of the screw, thereby restricting axial movement of the screw.

5 Claims, 15 Drawing Sheets

SCREW MOUNTING STRUCTURE OF AN INJECTION MOLDING MACHINE

RELATED APPLICATIONS

The present application is based on, and claims priority from, Japanese Application Number 2011-229610, filed Oct. 19, 2011, the disclosure of which is hereby incorporated by reference herein in its entirety.

BACKGROUND OF THE INVENTION

1. Field of the Invention

The present invention relates to a fixing mechanism of a screw of an injection molding machine.

2. Description of Related Art

In general, an injection molding machine includes, as a pedestal, a screw driving portion connected to a power source such as a motor to rotate a screw and to move the screw forward and backward, wherein the screw is mounted to the screw driving portion. There are various types of structures for mounting the screw. One of such mounting structures is a structure for connecting the screw to the screw driving portion by forming a notch in the screw and inserting members called retainers into the notch. For example, the above-described notch in the screw is pinched in a set of two retainers in semicircular shapes obtained by splitting a ring and a fixing bushing is fitted and fixed to cover the retainers. Keys or splines to be fitted with each other are formed in advance on the screw and the fixing bushing and forces for moving the screw forward and backward and rotating the screw are transmitted to the screw through the retainers and the fixing bushing. This screw mounting structure in which the semicircular retainers is used is often employed in the molding machine.

On the other hand, the screw needs to be detached frequently from the screw driving portion for cleaning, change of the screw due to change of a mold, and the like. In this case, in the above-described connection using the semicircular retainers, the fixing bushing needs to be detached first from the screw driving portion to touch the retainers. However, the fixing bushing is fixed to the screw driving portion by using many bolts in order to transmit large power to the screw and therefore it takes much work to detach the fixing bushing. If the screw is detached frequently, poor workability in changing the screw results in poor productivity.

Therefore, in order to improve workability, some structures, with which the screw can be easily detached easily by detaching only the retainers without detaching the fixing bushing, have been proposed.

There is a structure as disclosed in Japanese Utility Model Application Laid-Open No. 7-42689, in which a hole into which a screw is inserted and a hole orthogonal to an axial direction of the screw are formed in a screw mounting portion and a retainer is inserted into the hole orthogonal to the axial direction of the screw so as to pass through notches in the screw.

There is a structure as disclosed in Japanese Patent Application Laid-Open No. 8-118438, in which splines and notches are formed in a screw, a fixing bushing having grooves is connected through the splines to the screw, and retainers fitted in the notches through the grooves protrude outside from the fixing bushing.

However, these days, output of a motor or the like is increasing and it is sufficiently possible to drive the screw driving portion even if an output of the motor is directly connected to the screw driving portion without speed reduction by a pulley or the like. In such a structure, the screw driving portion tends to be designed to be small and light to reduce an inertial force so as to improve performance in operation.

In the structure disclosed in Japanese Utility Model Application Laid-Open No. 7-42689 described above, the retainer fixes both rotation and forward and backward movements of the screw. When torque to be transmitted and power for the forward and backward movements are large, the screw is restricted in terms of strength. Moreover, because the hole into which the screw is inserted is formed in the connecting portion, it is difficult to adapt to a wide range of screw diameters.

In the structure disclosed in Japanese Patent Application Laid-Open No. 8-118438 described above, retainer fixing portions are provided to the screw driving portion on an outer peripheral side of the fixing bushing. Therefore, if the screw driving portion is as small as the fixing bushing, it is impossible to form bolt holes and pin holes for fixing the retainers and, as a result, the retainers cannot be fixed.

Moreover, because the retainers are mounted to the screw driving portion, clearances are formed between the fixing bushing and front sides of the retainers. Therefore, the retainers are supported by retainer fixing bolts when the screw moves backward and forces in bending directions are likely to be applied to the retainers and the retainer fixing bolts.

Furthermore, if the retainer fixing bolts are detached, the retainers come off, which may causes the retainers to drop off during work. Moreover, because the retainers have such widths as not to interfere with fixing bolts of the fixing bushing, the retainers cannot have large widths and are restricted in terms of shape if many fixing bolts are used.

SUMMARY OF THE INVENTION

Therefore, with the above problems of the prior art in view, it is an object of the present invention to provide a screw mounting structure of an injection molding machine in which workability in changing a screw is satisfactory in mounting the screw by using retainers and a fixing bushing, and which is adaptable to a case where a size of a screw driving portion is small.

In a screw mounting structure of an injection molding machine according to the invention, a screw is fixed to a screw driving portion which transmits a rotating force and forward and backward thrusts to the screw, wherein an engaging groove is formed in an outer periphery of a base portion of the screw, and a retainer for restricting axial movement of the screw is engaged with the engaging groove, and a fixing bushing for restricting movement of the screw in a rotating direction, having a hole through which the base portion of the screw is inserted and which has a key or a spline formed therein, is fixed to the screw driving portion. Further, in the screw mounting structure of an injection molding machine, a guide groove for allowing the retainer, provided in a direction orthogonal to a rotary axis of the screw, to slide is formed in the fixing bushing and/or the screw driving portion, and a member for fixing the retainer, inserted through the guide groove, to the fixing bushing and a member for fixing the fixing bushing to the screw driving portion are provided to the fixing bushing.

An elongated hole or a notch may be formed in the retainer, and movement of the retainer in a sliding direction in the guide groove may be restricted by a bolt or a pin inserted through the elongated hole or the notch.

The bolt inserted through the elongated hole or the notch in the retainer may be a bolt for fixing the fixing bushing to the screw driving portion.

A cylindrical space may be formed on an outer side of the screw and between the screw and the fixing bushing or between the screw and the screw driving portion, and a width of the guide groove in the fixing bushing, in a direction orthogonal to the sliding direction of the retainer, may be smaller than an outer diameter of the cylindrical space.

According to the invention, it is possible to provide the screw mounting structure of the injection molding machine in which the workability in changing the screw is satisfactory and it is possible to adapt to the small screw driving portion in mounting the screw by using the retainer and the fixing bushing.

BRIEF DESCRIPTION OF THE DRAWINGS

The above and other objects and features of the present invention will become apparent from the following description of the embodiments with reference to the accompanying drawings, wherein.

DETAILED DESCRIPTION OF THE PREFERRED EMBODIMENTS

Figure 1:
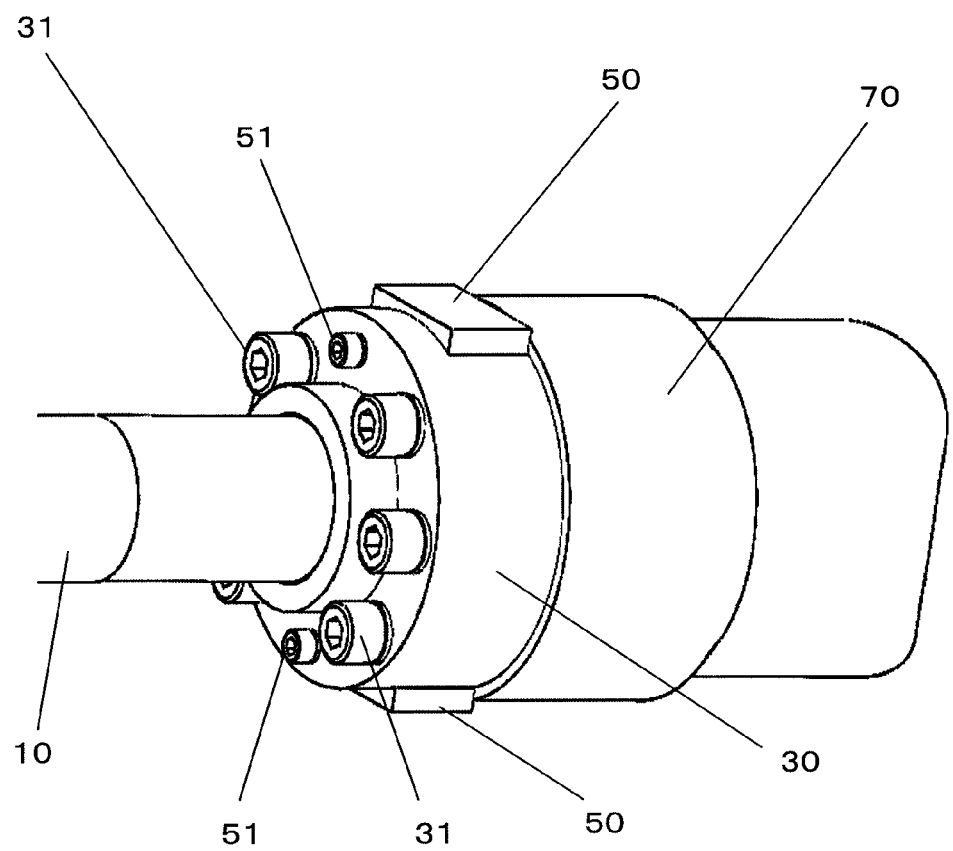
FIG. 1 is an external view of a first embodiment of a screw mounting structure of an injection molding machine according to the invention.

The present invention relates to a screw mounting structure of an injection molding machine in which a means for fixing sliding of retainers is provided to a fixing bushing to enable the retainers to be fixed, even if a screw driving portion is as small as the fixing bushing, and the retainers are less likely to be bent in a backward movement of a screw. The invention also relates to a screw mounting structure of an injection molding machine in which elongated holes or notches are formed in the retainers to restrict the sliding of the retainers and the retainers are prevented from dropping off from the fixing bushing in detachment of the screw. The invention further relates to a screw mounting structure of an injection molding machine in which fixing bolts for fixing a bushing are used as the means for restricting the sliding of the retainers and, as a result, shapes of the retainers are less likely to be restricted by the number of fixing bolts for fixing a bushing.

Embodiments of the invention will be described below by using the drawings. Members having the same functions in the respective embodiments will be provided with the same reference numerals and described.

First Embodiment

Figure 2:
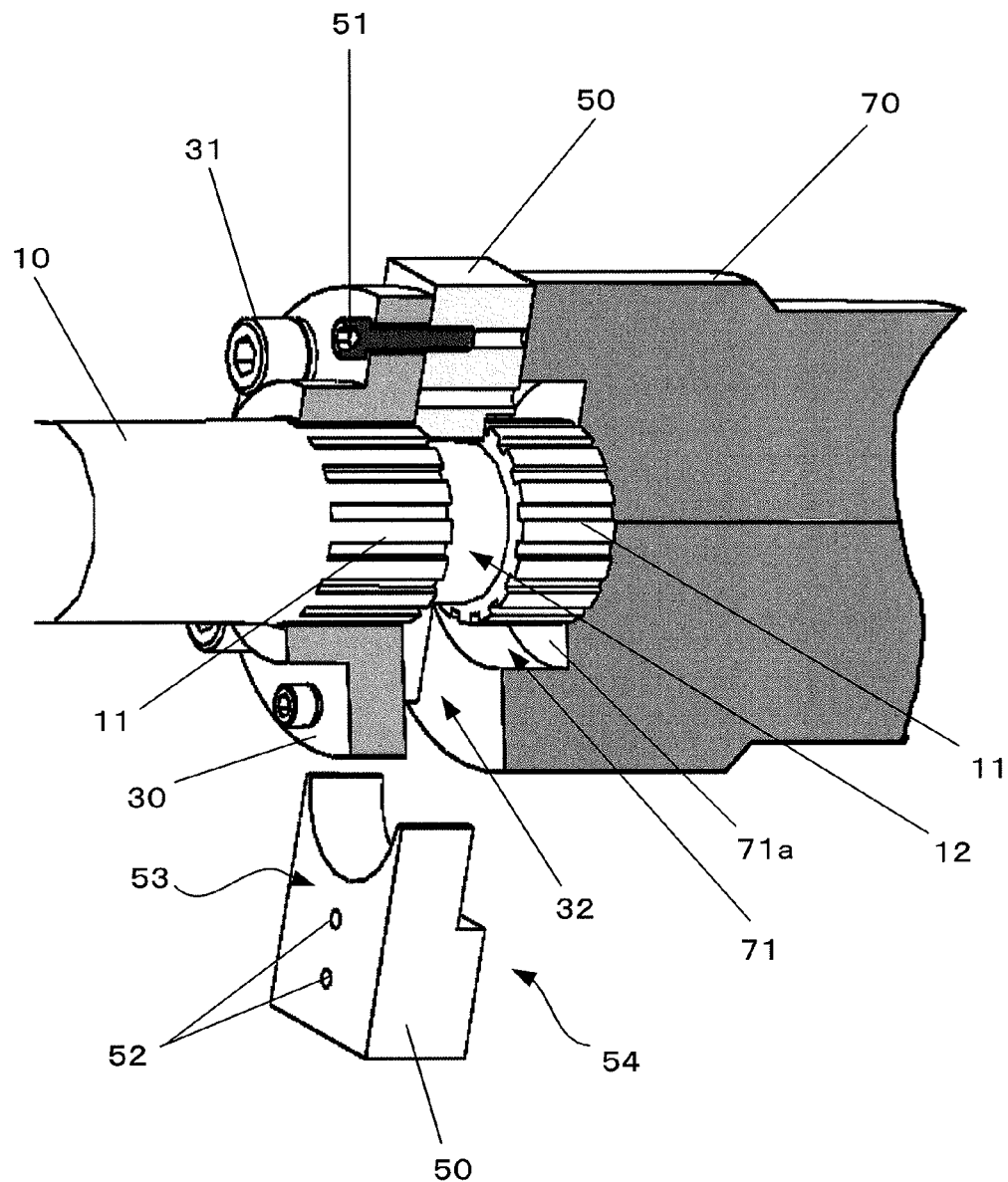
FIG. 2 is a sectional view of a screw axial portion in the screw mounting structure in FIG. 1.

FIG. 1 is an external view of the first embodiment of the screw mounting structure of the injection molding machine according to the invention. FIG. 2 is a sectional view of a screw axial portion in FIG. 1. In FIG. 2, the screw driving portion, one of the retainers, the retainer fixing bolt fixing bushing are shown in section. For explanation, an upper half of FIG. 2 shows a state in which the retainer is engaged with the screw and a lower half of FIG. 2 shows a state in which the retainer is detached.

First, as shown in FIG. 2, splines 11 and a notch 12 are formed at a base portion (root) of the screw 10. The splines 11 are divided by the notch 12. The notch 12 is formed in a groove shape at the base portion (root) of the screw 10 by shaving a predetermined thickness off a periphery of a central axis of the screw 10. A through hole through which the base portion (root) of the screw 10 passes is formed in a central portion of the fixing bushing 30 and splines 35 to be fitted with the splines 11 on the screw 10 are formed on a peripheral face of the through hole (see FIG. 15). In this way, the fixing bushing 30 has the hole, through which the base portion of the screw is to be inserted and which has keys or the splines, to restrict a movement of the screw 10 in a rotating direction with the splines.

The root of the screw 10 passes through the fixing bushing 30 and comes in contact with a bottom face 71a of a fitting portion 71 of the screw driving portion 70 (only part of which is shown in FIGS. 1 and 2). Because the splines 11 are formed in front of and behind the notch 12, the splines 35 (FIG. 15) formed on the peripheral face of the through hole in the fixing bushing 30 do not obstruct insertion of the screw 10 through the through hole.

A protruding portion (not shown) is provided to the fixing bushing 30 and a recessed portion (not shown) is provided to the screw driving portion 70 and the protruding portion of the fixing bushing 30 and the recessed portion of the screw driving portion 70 are fitted with each other. For this fitting, the fixing bushing 30 may be provided with the recessed portion and the screw driving portion 70 may be provided with the protruding portion. By fitting the recessed portion and the protruding portion with each other, the screw 10 is mounted to the screw driving portion 70 with a rotation axis of the screw 10 and a rotation axis of the screw driving portion 70 aligned with each other.

A guide groove 32 is formed in the fixing bushing 30 in a direction orthogonal to the rotation axis. The retainers 50 are inserted from outside the fixing bushing 30, slid along the guide groove 32, and mounted to the fixing bushing 30. The groove along which the retainers 50 are slid may be formed in the screw driving portion 70 instead of the fixing bushing 30 or may be formed in both of the fixing bushing 30 and the screw driving portion 70 so as to be positioned astride them.

The retainers 50 are a set of two block-shaped members having, at a central portion, fitting portions which fit a shape of the notch 12 and the retainers 50 are fixed to the fixing bushing 30 by retainer fixing bolts 51 while fitted in the notch 12 in the screw 10. If the notch 12 is formed throughout the peripheral face of the screw 10 as shown in FIG. 2, the fitting portions of the retainers 50 are formed in arc shapes.

In this way, a rotating force for the screw that is generated by the motor is transmitted to the screw 10 through the screw driving portion 70, the fixing bushing 30, and the splines 11 and forward and backward thrusts by the motor are transmitted to the screw 10 through the retainers 50 or the bottom face 71a of the fitting portion 71 of the screw driving portion 70.

Here, transmission of the forward and backward thrusts for the screw 10 will be described. In the structure shown in FIG. 2, an end face of the base portion (root) of the screw 10 is in contact with the bottom face 71a of the fitting portion 71 of the screw driving portion 70. Therefore, by adjusting a position of the notch 12 in the screw 10, a width of the notch 12, and thicknesses of the fitting portions of the retainers 50, the bottom face of the fitting portion 71 of the screw driving portion 70 can push the end face of the screw base portion (root) in the forward movement of the screw while the retainers 50 can pull the screw 10 in the backward movement of the screw.

Normally, larger power is necessary in the forward movement of the screw than in the backward movement of the screw in the injection molding. Therefore, by assigning transmission of the power in the forward movement of the screw to the bottom face of the fitting portion 71 of the screw driving portion 70 for which it is easy to have a large contact area, it is possible to reduce an area of the notch 12 of the screw 10 which comes in contact with the retainers 50, which suppresses reduction in strength of the screw 10 caused by the notch 12.

Furthermore, retainer front sides 53 of the retainers 50 are pushed against the fixing bushing 30 in the backward movement of the screw and therefore it is unlikely that forces in bending directions are applied to the retainers 50 and the retainer fixing bolts 51. Therefore, it is possible to reduce the size of the retainer fixing bolts 51.

Figure 3:
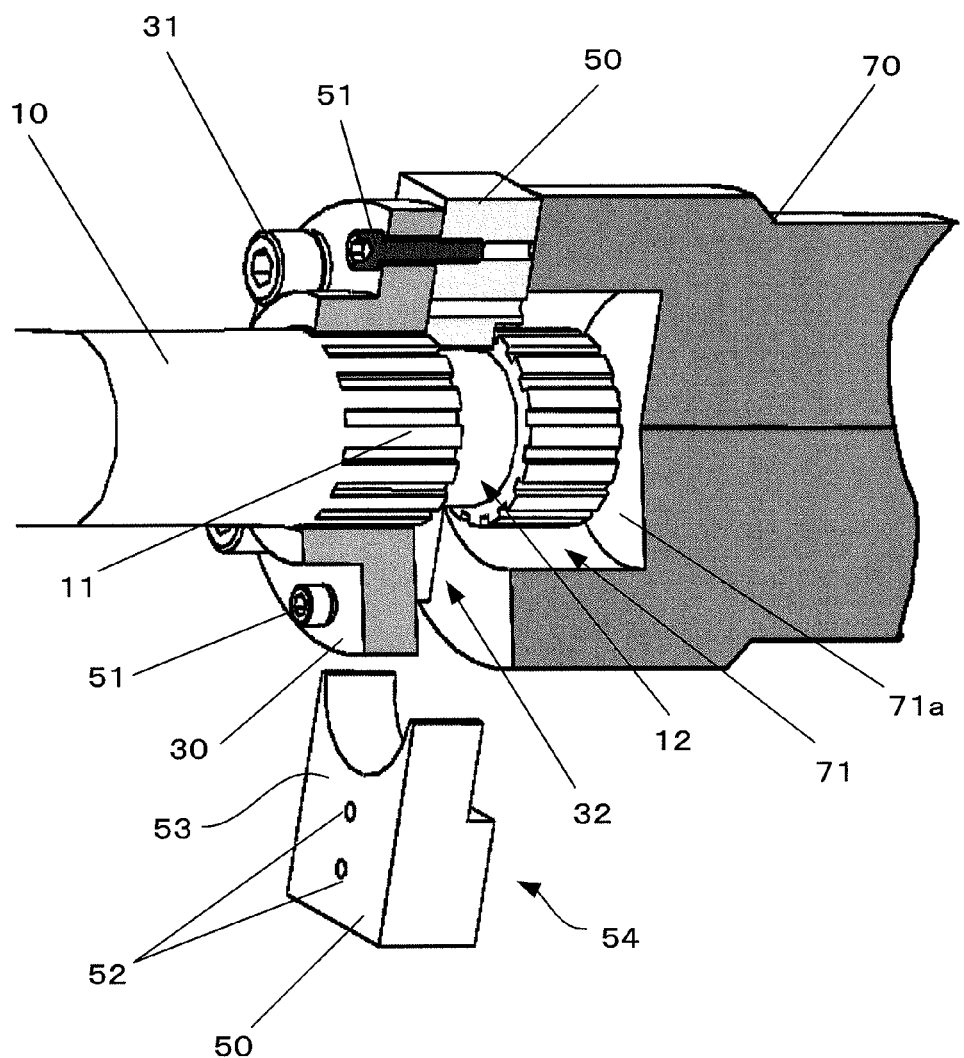
FIG. 3 is a drawing showing a variation of the screw mounting structure shown in FIG. 2.

Alternatively, the screw 10 may be mounted to the screw driving portion 70 as shown in FIG. 3. A mounting structure in FIG. 3 is different from the mounting structure in FIG. 2 in that a bottom face 71a of a fitting portion 71 of the screw driving portion 70 is not in contact with an end face of a base portion (root) of the screw 10. In this case, the power is transmitted to the screw by the retainers 50 in each of the forward movement and the backward movement of the screw 10.

In the mounting structure in FIG. 2, while the power transmission is shared, the different members push and pull the screw 10 in the forward movement and the backward movement of the screw 10 and therefore designing of tolerance is difficult and the screw 10 is likely to have backlash in directions of the forward and backward movements. In the mounting structure in FIG. 3, on the other hand, it is possible to suppress the backlash in the forward and backward movements of the screw by only adjusting tolerance of the fitting portions between the screw 10 and the retainers 50. A designer can select the mounting structure in FIG. 2 or the mounting structure in FIG. 3 in consideration of the magnitude of the power used in the molding machine and accuracy of position control of the screw 10.

Figure 4:
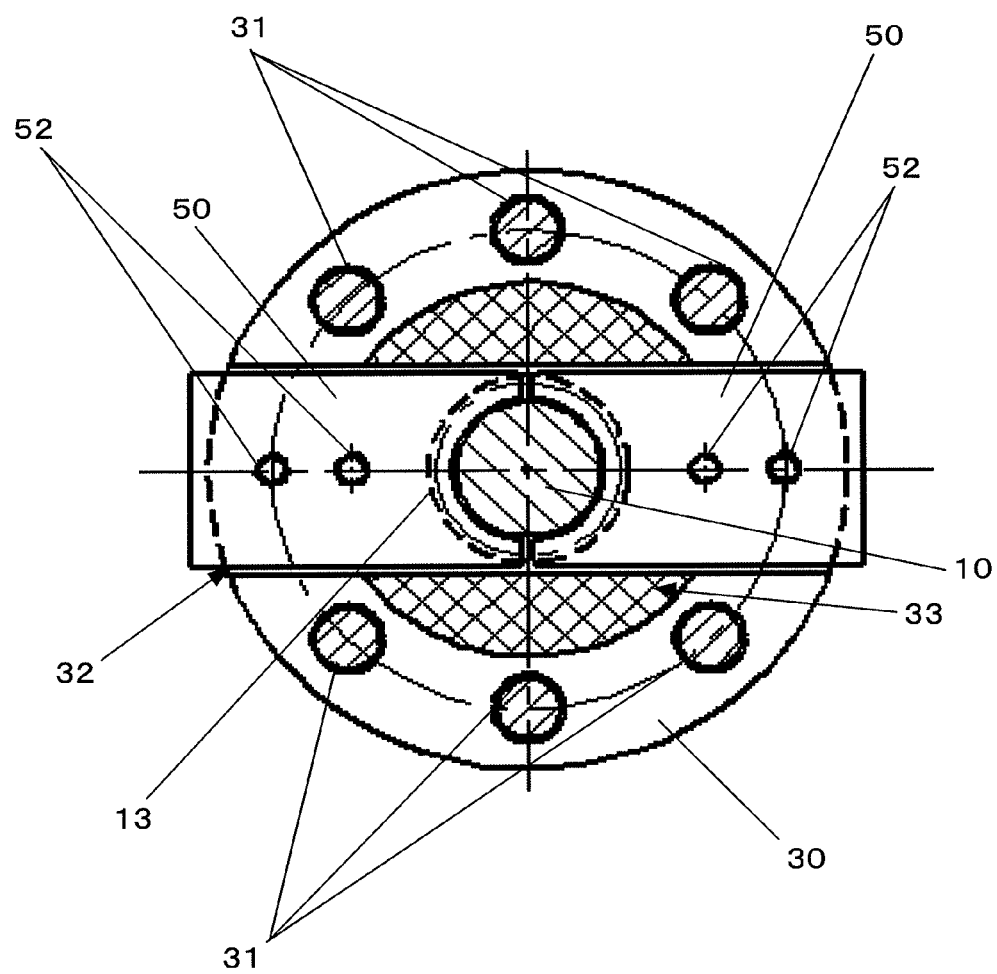
FIG. 4 is a sectional view (when a screw is connected) of a contact face between retainers and a screw driving portion in the screw mounting structure in FIG. 1, viewed in a direction facing the retainers.
Figure 5:
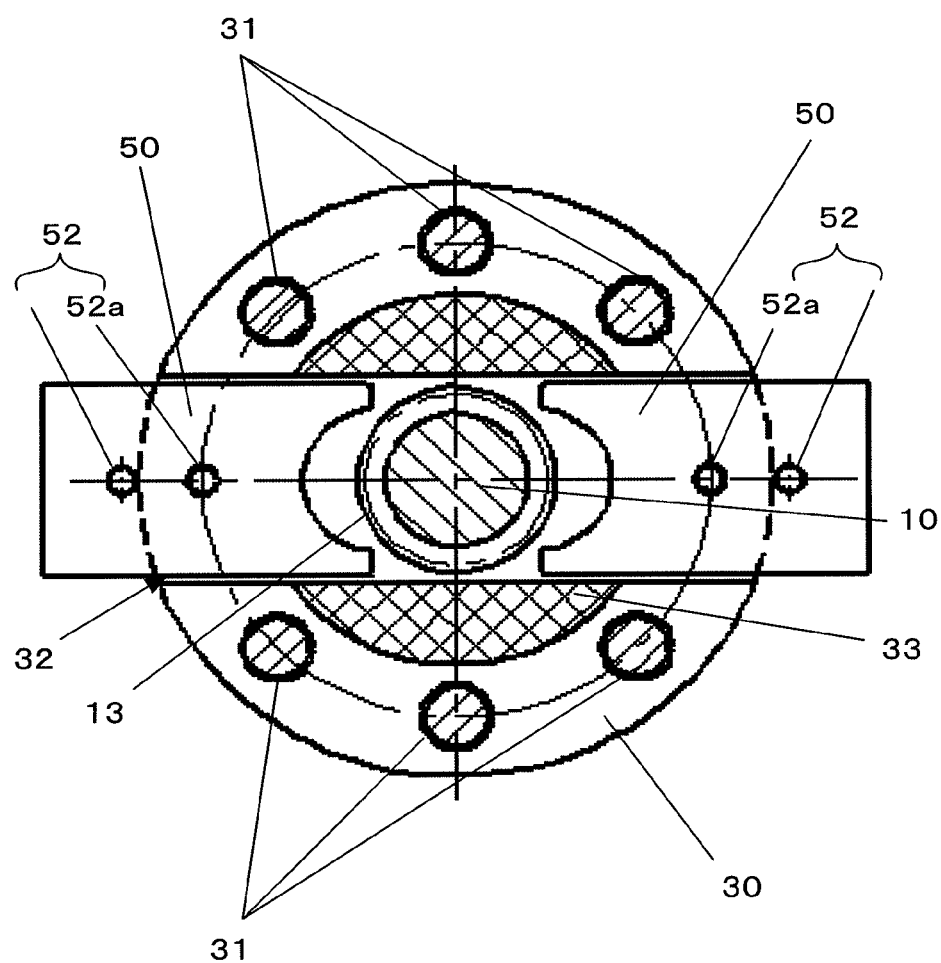
FIG. 5 is a sectional view (when the screw is detached) of the contact face between the retainers and the screw driving portion in the screw mounting structure in FIG. 1, viewed in the direction facing the retainers.

Next, mounting and detachment of the screw in the first embodiment of the screw mounting structure according to the invention and shown in FIG. 1 will be described by using FIGS. 4 and 5. FIGS. 4 and 5 show sections along a contact face between the retainers 50 and the screw driving portion 70, viewed in a direction facing the retainers. FIG. 4 shows a state in which the screw 10 is mounted to the screw driving portion 70 and FIG. 5 shows a state in which the screw 10 can be detached from the screw driving portion 70.

As described above, the retainers 50 are a set of two members and can slide along the guide groove 32 formed in the fixing bushing 30. In the state in which the screw 10 is mounted to the screw driving portion 70, as shown in FIG. 4, the retainers 50 are fitted on an inner side with respect to an outer periphery 13 of the screw 10. The fixing bushing 30 is mounted to the screw driving portion 70 by fixing-bushing fixing bolts 31. The fixing-bushing fixing bolts 31 are arranged so as not to interfere with the retainers 50.

By screwing the retainer fixing bolts 51 into the retainer fixing bolt holes 52 formed in the retainers 50 through the fixing bushing 30, the retainers 50 are fixed to the fixing bushing 30.

On the other hand, to detach the screw 10 from the fixing bushing 30 and the screw driving portion 70, the retainer fixing bolts 51 are detached first and then respective retainers 50 of the set of two retainers 50, which are now able to slide along the guide groove 32, are drawn respectively outward with respect to the fixing bushing until the fitting portions of the retainers 50 are positioned outside the screw outer periphery 13. The state in which the retainers 50 are drawn out of the notch 12 is shown in FIG. 5.

In FIG. 5, retainer fixing bolt holes 52 (see bolt holes 52a on inner sides in a radial direction of the fixing bushing in FIG. 5) are formed in the retainers 50 so that the retainers 50 can be fixed in the state in which the retainers 50 are slid to positions at which the screw is allowed be pulled out. Although the retainers 50 do not necessarily have to be fixed in the guide groove 32 in detaching the screw 10, it is effective in improving workability to fix the retainers 50 so that the retainers 50 do not drop off from the guide groove 32 or slide along the guide groove 32 under their own weights.

If the screw 10 is pulled out to a front side (a tip end side of the screw) after the retainers 50 are slid along the guide groove 32, the screw 10 can be detached from the fixing bushing 30 and the screw driving portion 70. On the other hand, to mount the screw, the screw 10 is inserted into a predetermined position in the fixing bushing 30, the retainers 50 are slid along the guide groove and fitted with the screw 10, and the retainers 50 are fixed to the screw driving portion 70 by the retainer fixing bolts 51 to complete the work.

As described above, with only attachment and detachment of the two retainer fixing bolts 51 and sliding of the retainers 50, it is possible to achieve the structure for mounting and detaching the screw 10 to and from the screw driving portion 70. Although the retainers 50 are the block-shaped members in the first embodiment, the retainers 50 are not limited to these shapes but may be rod-shaped or plate-shaped members. Alternatively, the retainers 50 may be pins or plungers for fixing the sliding. In this case, the notch formed in the base portion (root) of the screw 10 to be fitted with the retainers 50 may be in a hole shape. The notch 12 or the hole formed in the base portion of the screw is collectively referred to as an engaging groove formed in the screw base portion in this specification.

Second Embodiment

In the mounting structure of the screw 10 in which the retainers 50 and the fixing bushing 30 are used, the retainers 50 and the fixing bushing 30 increase in size as a diameter of the screw 10 increases and the force to be transmitted increases. In this case, if the retainers 50 come off when replacing the screw 10, the retainers 50 or other parts may be damaged.

Figure 6:
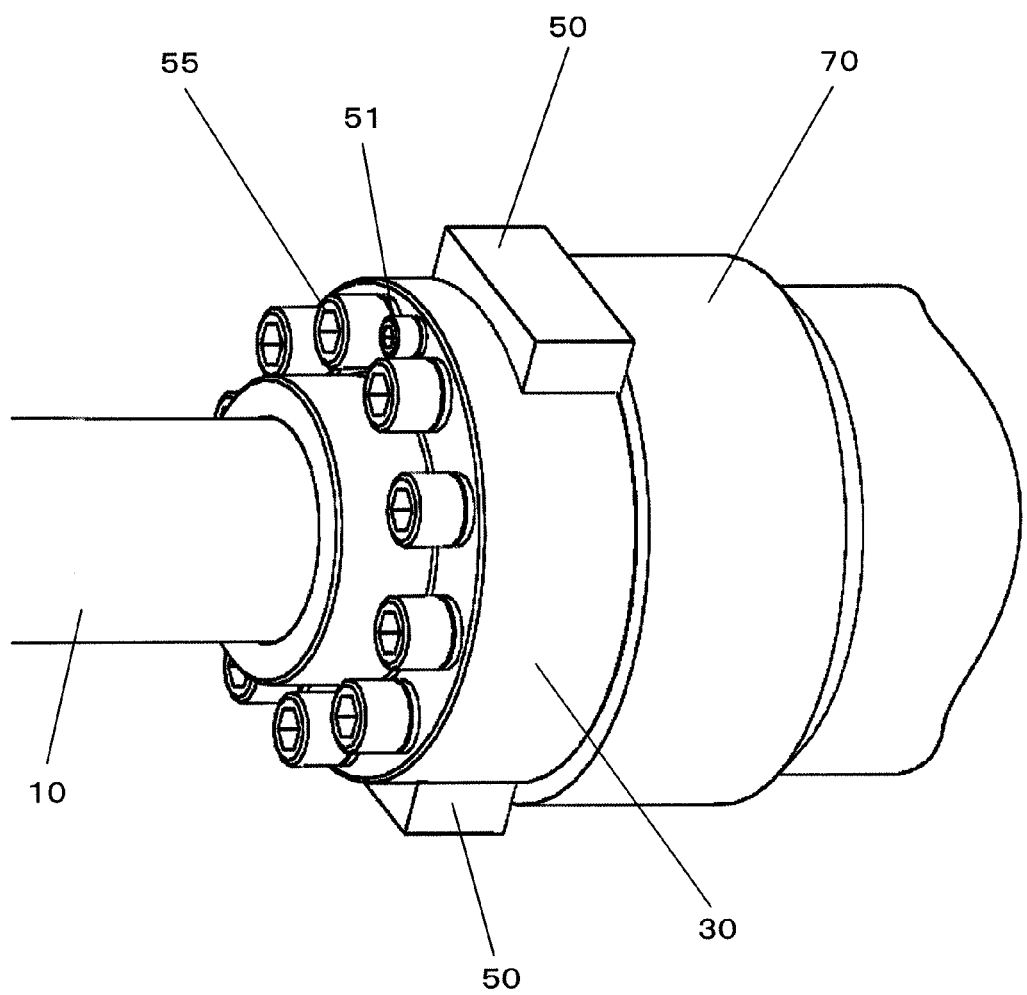
FIG. 6 is an external view of a second embodiment of the screw mounting structure of the injection molding machine according to the invention.
Figure 7:
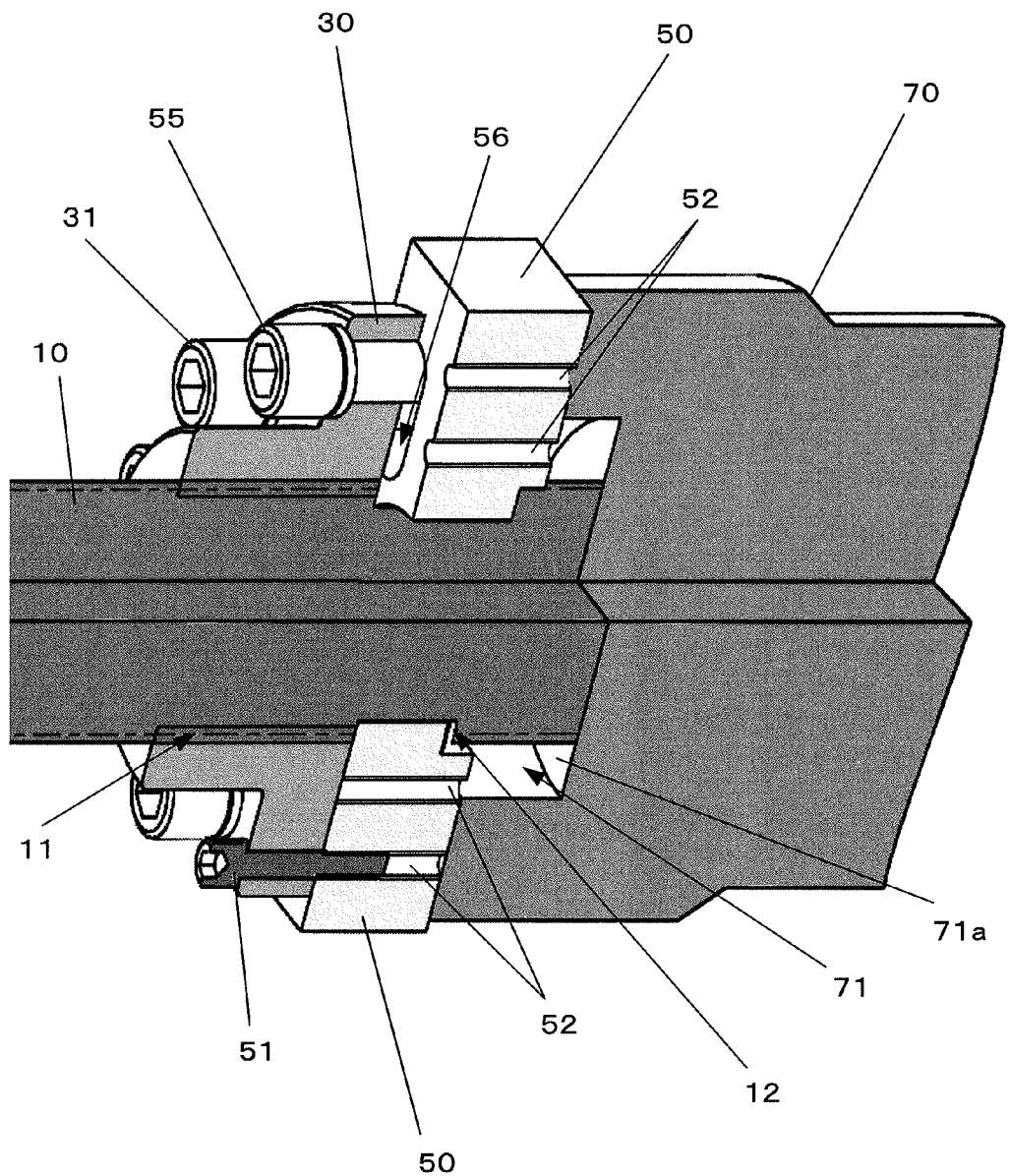
FIG. 7 is a sectional view of a screw axial portion in the screw mounting structure in FIG. 6.

Therefore, a second embodiment of the screw mounting structure of the injection molding machine according to the invention in which the retainers 50 are prevented from coming off is shown in FIG. 6. A section of FIG. 6 along a screw axial direction is shown in FIG. 7 and a section of a contact face between the retainers and a screw driving portion, viewed in a direction facing the retainers, is shown in FIGS. 8 and 9.

In the second embodiment, elongated holes (retainer elongated holes 56) are formed in the retainers 50. Retainer restricting bolts 55 are fixed to the fixing bushing 30 and tip ends of the retainer restricting bolts 55 are inserted into the retainer elongated holes 56 in the retainers 50. The other structures are the same as those shown in FIG. 2. The retainer elongated holes 56 in the retainers 50 have at least sufficient lengths to allow the retainers 50 to slide from such positions as to be fitted with the notch 12 in the screw 10 to positions outside an outer diameter of the screw.

Mounting and detachment of the screw in the second embodiment of the screw mounting structure according to the invention, shown in FIG. 6, will be described by using FIGS. 8 and 9. FIG. 8 shows a state in which the screw 10 is mounted to the screw driving portion 70 and FIG. 9 shows a state in which the screw 10 can be detached from the screw driving portion 70.

Figure 8:
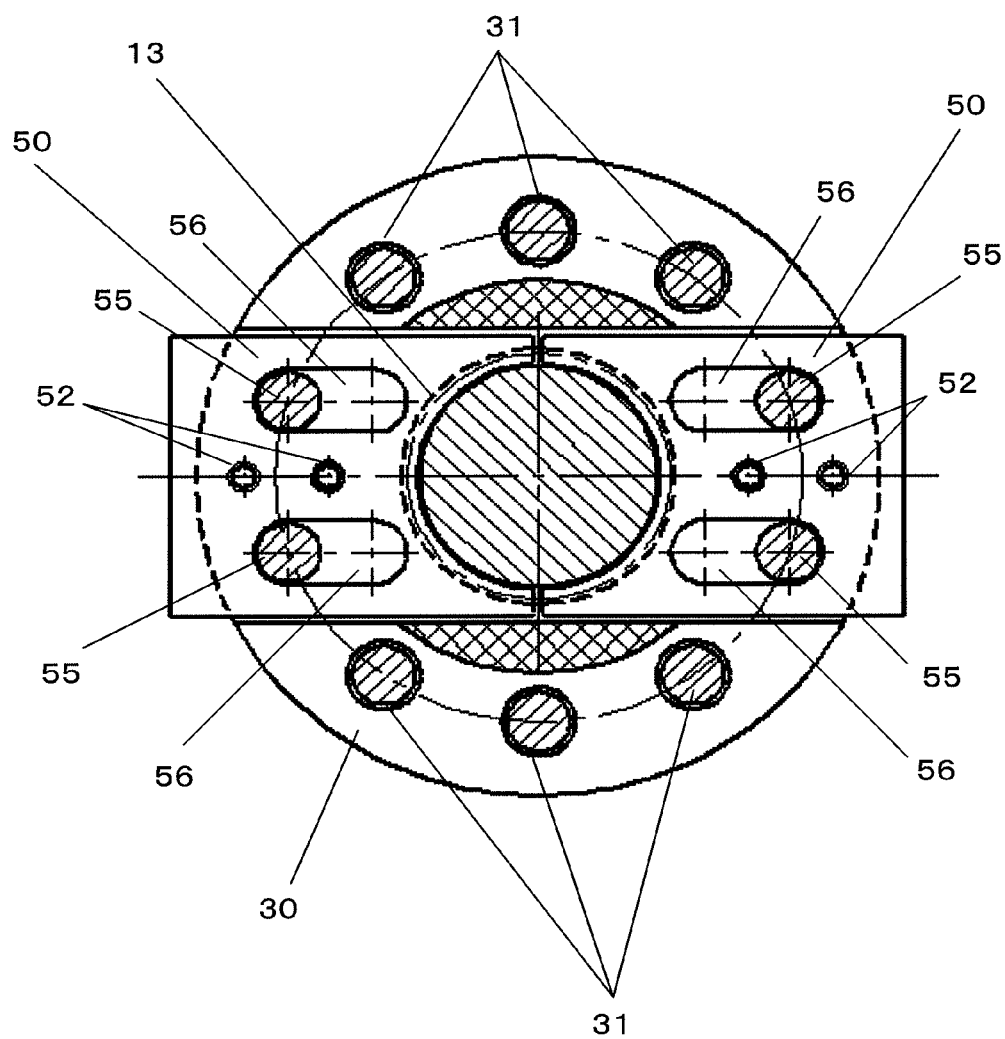
FIG. 8 is a sectional view (when a screw is connected) of a contact face between retainers (a first example) and a screw driving portion in the screw mounting structure in FIG. 6, viewed in a direction facing the retainers.
Figure 9:
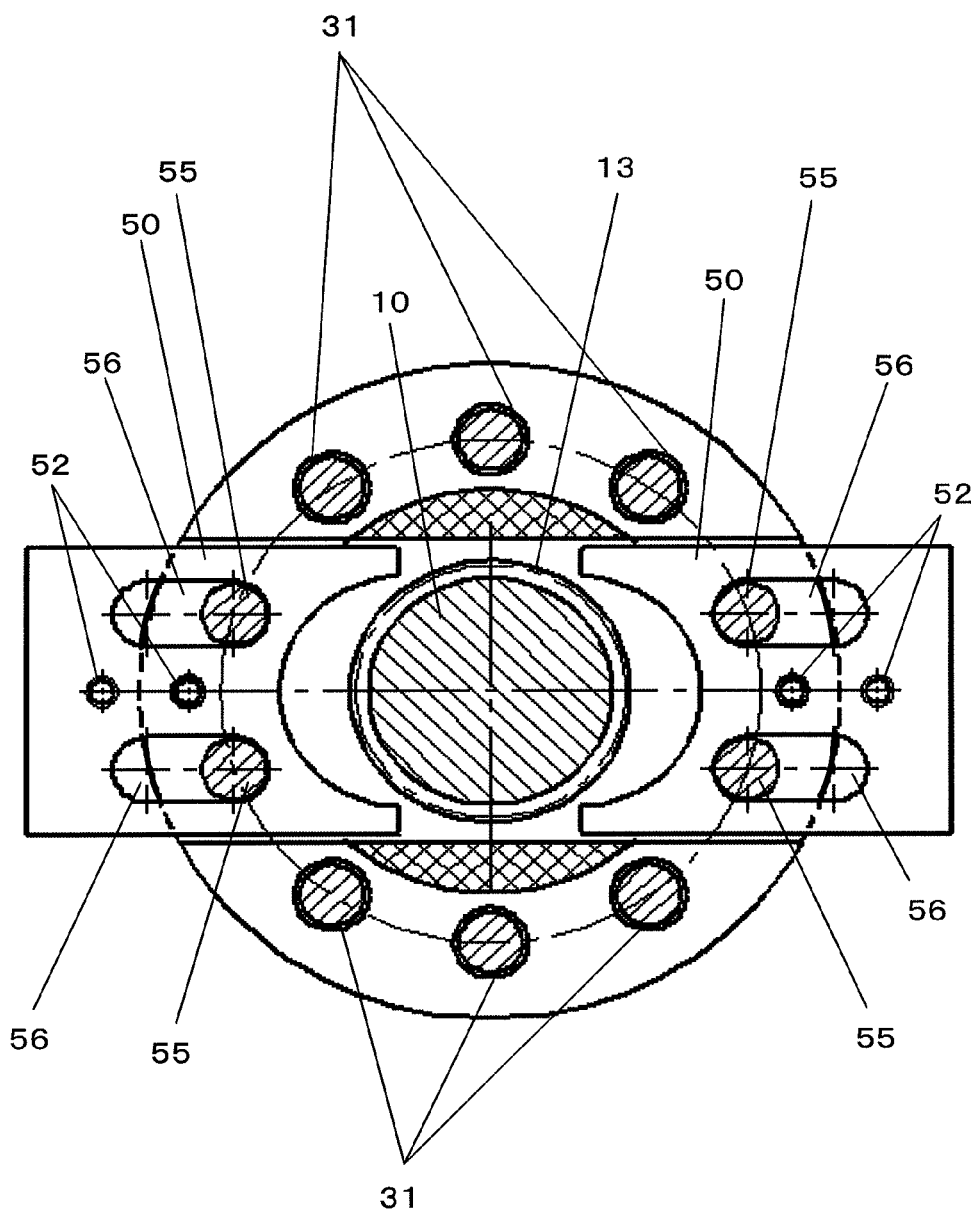
FIG. 9 is a sectional view (when a screw is detached) of the contact face between the retainers (the first example) and the screw driving portion in the screw mounting structure in FIG. 6, viewed in the direction facing the retainers.

In the second embodiment, in the same way as in the above-described first embodiment, the retainers 50 are a set of two members and fitted with the notch 12 in the screw 10 on an inner side with respect to the screw outer periphery 13 of the screw 10 in the mounted state of the screw shown in FIG. 8 in the same way as in the mounted state of the screw shown in FIG. 4. The retainers 50 are fixed to the fixing bushing 30 by screwing retainer fixing bolts 51 into retainer fixing bolt holes 52 (bolt holes 52 on outer sides in a radial direction of the fixing bushing in FIG. 8) formed in the retainers 50.

On the other hand, to detach the screw 10 from the fixing bushing 30 and the screw driving portion 70, the retainer fixing bolts 51 are detached first and then respective retainers 50 of the set of two retainers 50, which are now able to slide along a guide groove 32, are drawn respectively outward with respect to the fixing bushing until fitting portions of the retainers 50 are positioned outside the screw outer periphery 13. The state in which the retainers 50 are drawn out of the notch 12 is shown in FIG. 9.

Work for mounting the screw 10 to the fixing bushing 30 and the screw driving portion 70 and work for detaching the screw 10 from the fixing bushing 30 and the screw driving portion 70 are completed by only mounting and detaching the retainer fixing bolts 51 and sliding the retainers 50. At this time, because amounts of sliding of the retainers 50 are restricted by the retainer elongated holes 56 and the retainer restricting bolts 55 in the second embodiment, the retainers 50 do not come off and it is possible to avoid the above-described dangers caused by dropping off from the retainers.

In FIG. 9, retainer fixing bolt holes 52 (see bolt holes on inner sides in a radial direction of the fixing bushing in FIG. 9) are formed so that the retainers 50 can be fixed when the retainers 50 are slid to positions at which the screw is allowed be pulled out. Although the retainers 50 do not necessarily have to be fixed in the guide groove 32 in detaching the screw 10, it is effective in improving workability to fix the retainers 50 so that the retainers 50 do not slide along the guide groove 32 under their own weights.

As a result, according to the second embodiment, the screw can be easily detached and mounted in the same way as in the above-described first embodiment and also dropping off of the retainers can be prevented.

In the screw mounting structure shown in FIG. 7 as the second embodiment, although a bottom face 71*a* of a fitting portion 71 of the screw driving portion 70 and a base portion (root) of the screw 10 are in contact with each other as shown in FIG. 2 (the first embodiment), the bottom face 71*a* of the fitting portion 71 of the screw driving portion 70 and the base portion (root) of the screw 10 may not be in contact with each other as shown in FIG. 3 as a variation of FIG. 2. Either structure may be selected in consideration of the magnitude of the power to be used in the molding machine and the accuracy of the position control of the screw 10. Although the retainer restricting bolts 55 are used in the second embodiment, other structures may be employed instead. By using pins, instead of the bolts, to restrict the sliding of the retainers 50, the same effect can be obtained.

Figure 10:
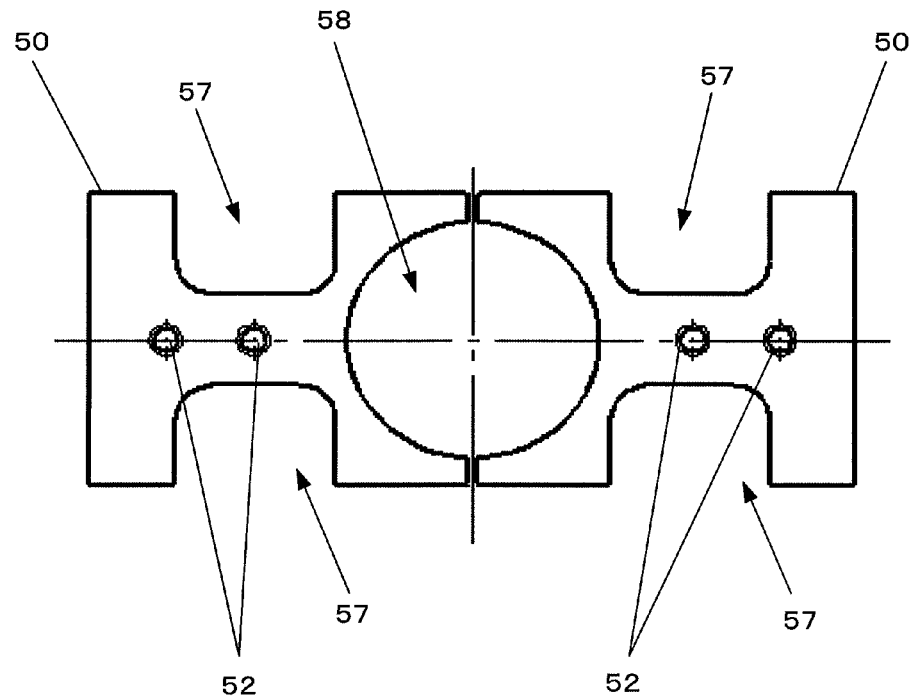
FIG. 10 is a drawing for explaining a second example of the retainers in the screw mounting structure in FIG. 6.
Figure 11:
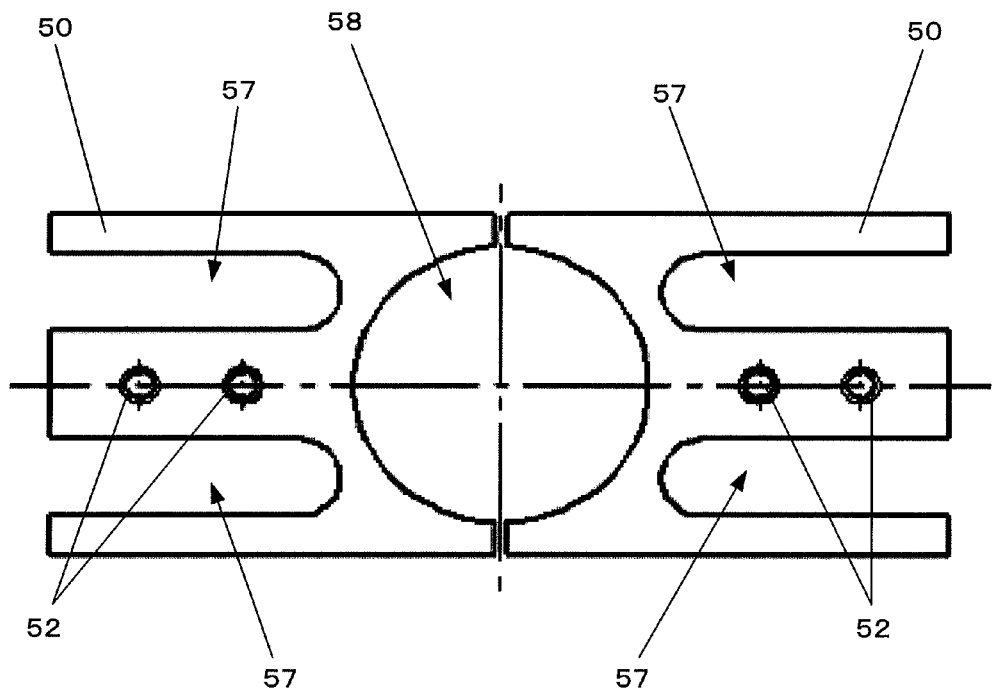
FIG. 11 is a drawing for explaining a third example of the retainers in the screw mounting structure in FIG. 6.
Figure 12:
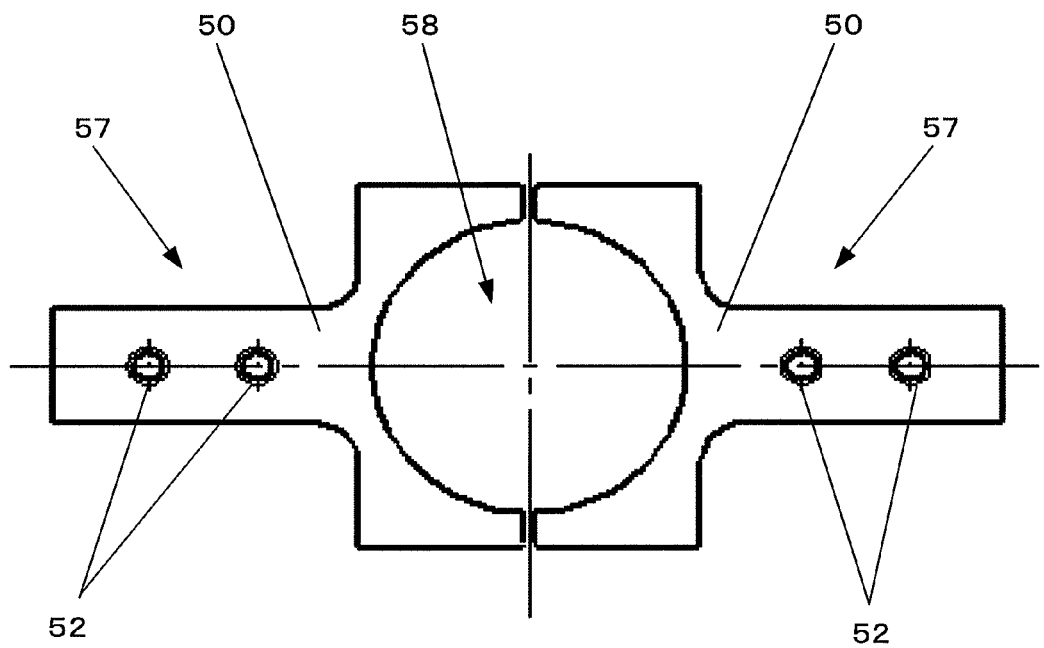
FIG. 12 is a drawing for explaining a fourth example of the retainers in the screw mounting structure in FIG. 6.
Figure 13:
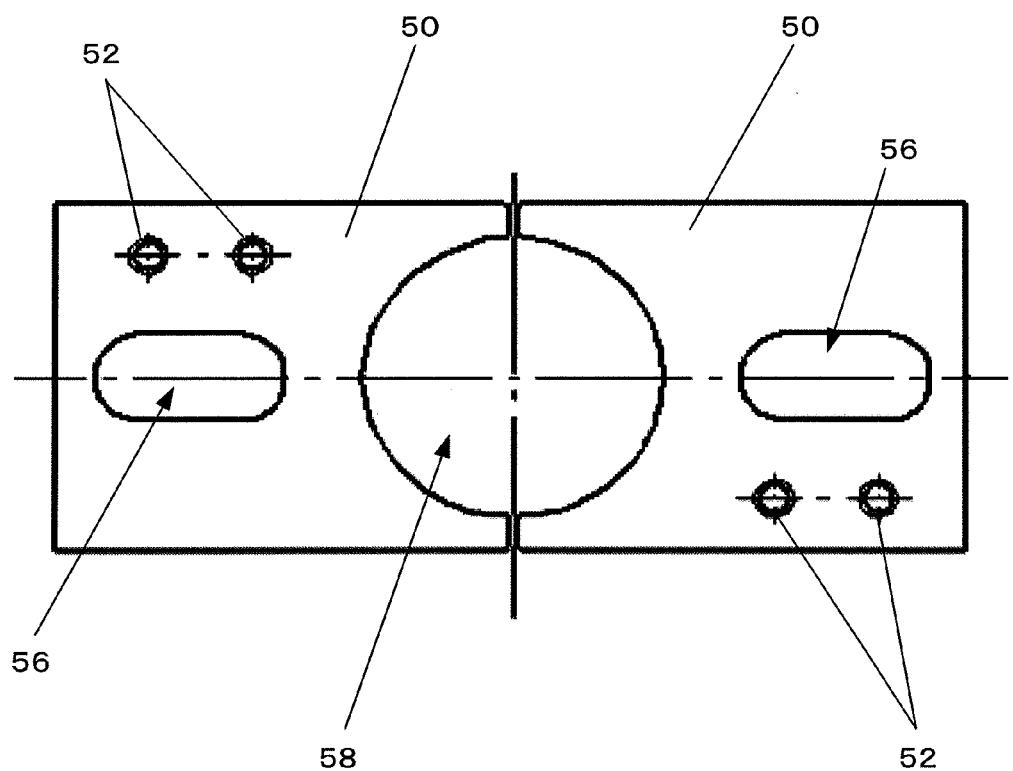
FIG. 13 is a drawing for explaining a fifth example of the retainers in the screw mounting structure in FIG. 6.

Although the retainer elongated holes 56 are formed in the retainers 50 in the second embodiment, other structures may be employed instead. By using notches 57 shown in FIGS. 10 to 12 to restrict the sliding of the retainers 50, the same effect can be obtained. The number of retainer elongated holes 56 or notches 57 may be determined based on shapes of the retainers 50 and the fixing bushing 30. If one retainer elongated hole 56 as shown in FIG. 13 or three or more retainer elongated holes 56 is (are) used, for example, to restrict the sliding of each of the retainers 50, the same effect can be obtained. Similarly to the first embodiment, the retainers 50 may be in shapes other than the block shapes shown in the drawings, e.g., rod shapes and plate shapes.

Third Embodiment

Figure 14:
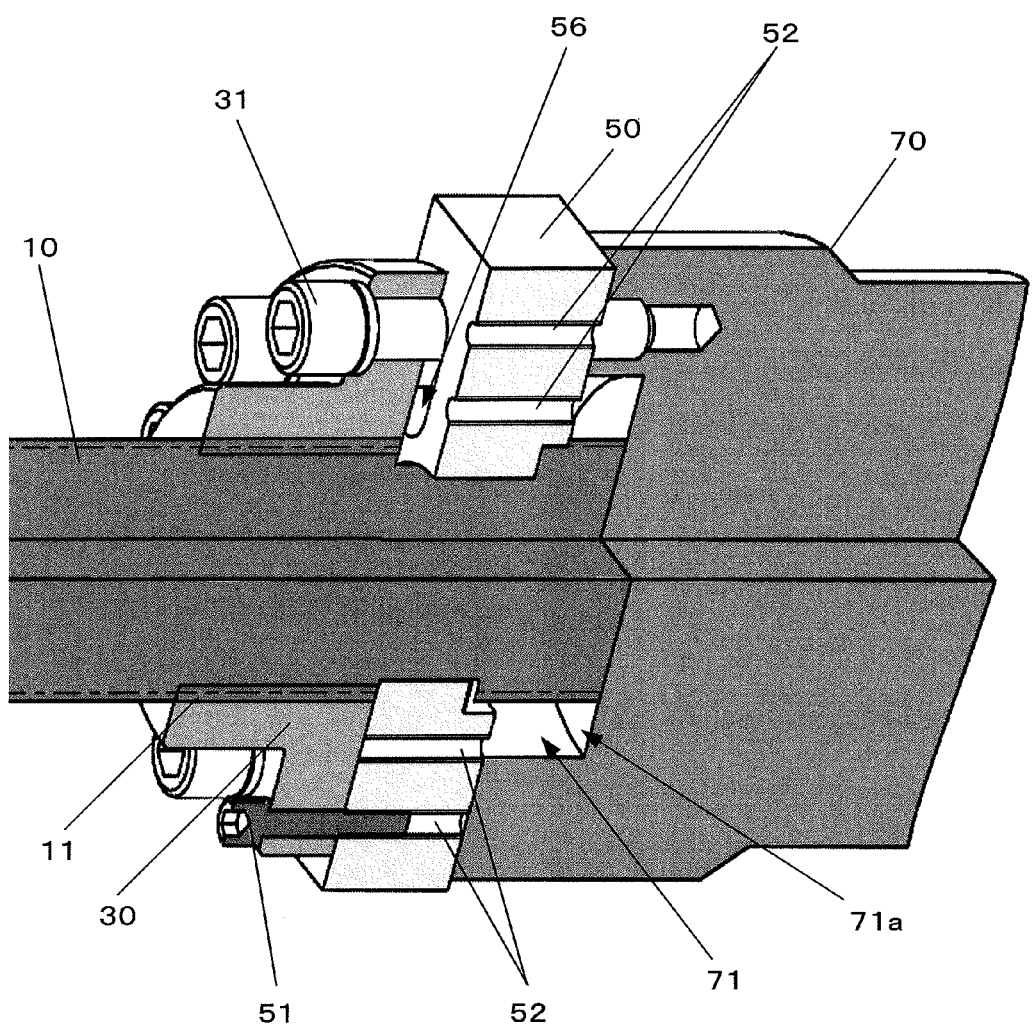
FIG. 14 is a drawing (a sectional view of a screw axial portion) for explaining a third embodiment of the screw mounting structure of the injection molding machine according to the invention.

As the force to be transmitted becomes larger, it becomes necessary to increase the size or the number of the fixing-bushing fixing bolts 31 for fixing the fixing bushing 30. A structure in which the retainers 50 are less susceptible to an arrangement of the fixing-bushing fixing bolts 31 even in such a case is shown in FIG. 14 as the third embodiment. Although the third embodiment has substantially the same structure as the above-described second embodiment, the third embodiment is different from the second embodiment only in that the retainer restricting bolts 55 shown in FIG. 7 (the second embodiment) are replaced by fixing-bushing fixing bolts 31 as shown in FIG. 14.

As shown in FIG. 14, the fixing-bushing fixing bolts 31 pass through the retainer elongated holes 56 formed in the retainers 50 to fix the fixing bushing 30 to the screw driving portion 70. Therefore, the fixing-bushing fixing bolts 31 passing through the retainer elongated holes 56 in the retainers 50 restrict the sliding of the retainers 50 but do not fix the retainers 50. In the arrangement shown in FIG. 8 in the above-described second embodiment, for example, by replacing the retainer restricting bolts 55 with the fixing-bushing fixing bolts 31, it is possible to use ten fixing-bushing fixing bolts 31 at the maximum.

In the third embodiment, it is unnecessary to avoid interference with the retainers 50 in disposing the fixing-bushing fixing bolts 31, which increases degrees of freedom in the arrangement of the fixing-bushing fixing bolts 31 and widths of the retainers 50. It is easy to adapt to demands for increase in the number of fixing-bushing fixing bolts 31 and increase in the widths of the retainers 50 in order to reduce contact face pressure.

Fourth Embodiment

Figure 15:
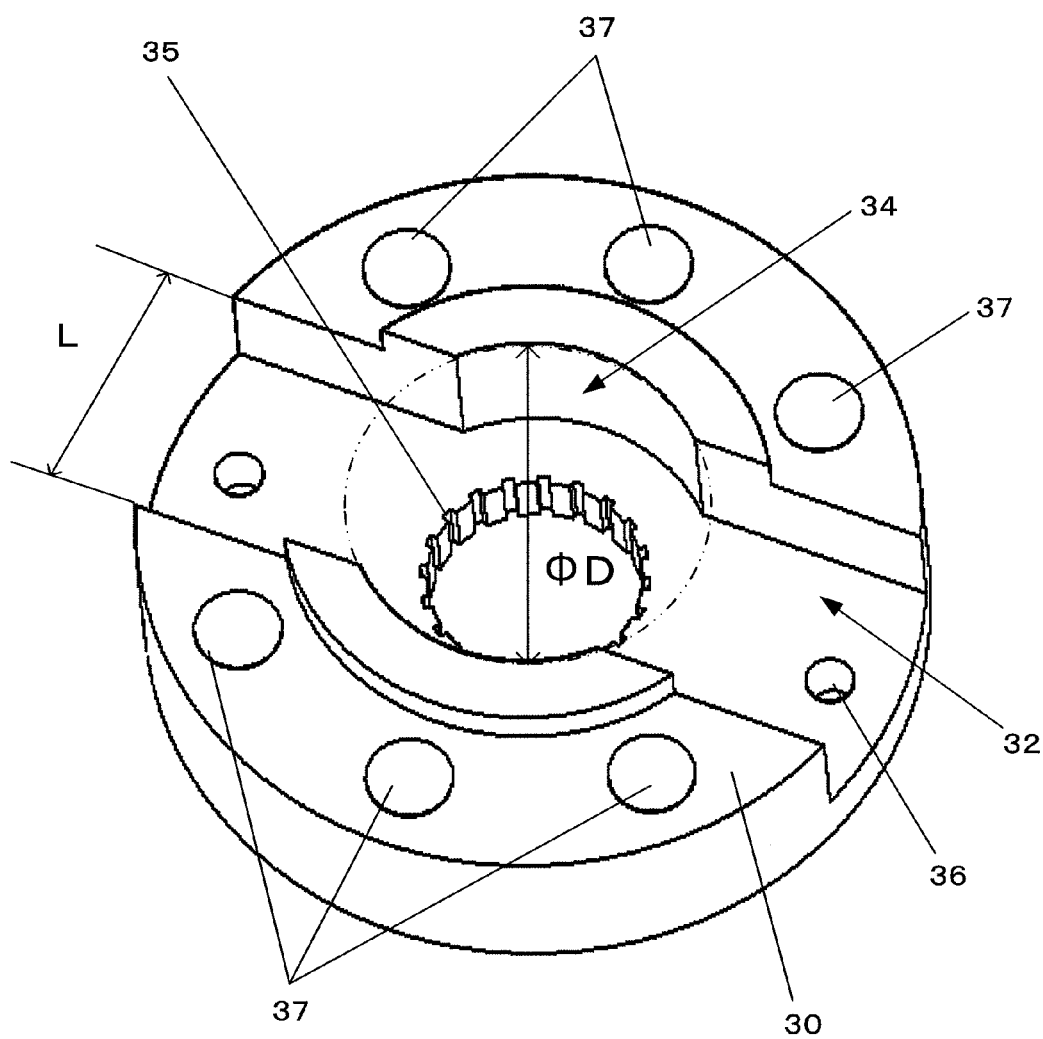
FIG. 15 is a drawing (an external view of a fixing bushing) for explaining a fourth embodiment of the screw mounting structure of the injection molding machine according to the invention.

The fourth embodiment in which the prior-art semicircular retainers 50 can be used will be described below by using FIG. 15. The fourth embodiment has the same structure as the first embodiment but is different from the first embodiment in that a fixing bushing 30 is in a shape shown in FIG. 15. An external appearance of the fourth embodiment of the screw mounting structure according to the invention is the same as that in FIG. 1 (the first embodiment) and therefore will not be described here. FIG. 15 is a drawing of the fixing bushing 30 as viewed from a side on which a screw driving portion 70 is mounted.

The fixing bushing 30 shown in FIG. 15 includes, in addition to the guide groove 32, a cylindrical space 34 which is concentric with a rotary shaft of the screw 10 and has a diameter $\phi D$ greater than a width L of a guide groove 32. By using the fixing bushing 30 in this shape, it is possible to use the semicircular retainers used in general in the prior art as well as the retainers in the shapes in the above-described embodiments of the invention. Bolt holes 37 are bolt holes through which or into which fixing-bushing fixing bolts 31 are inserted or screwed and bolt holes 36 are bolt holes through which or into which retainer fixing bolts 51 are inserted or screwed.

Figure 16:
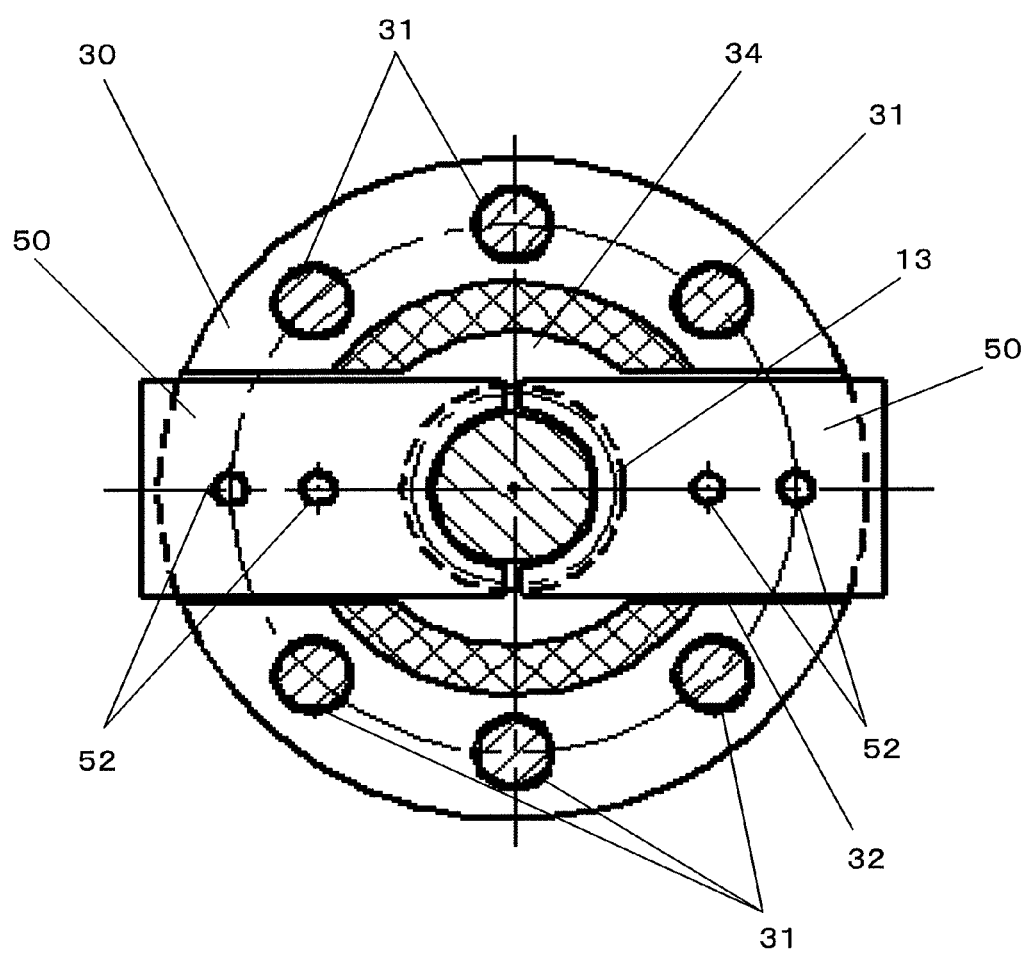
FIG. 16 is a drawing showing the retainers which are shown in FIG. 1 and mounted into a guide groove in the fixing bushing shown in FIG. 15.
Figure 17:
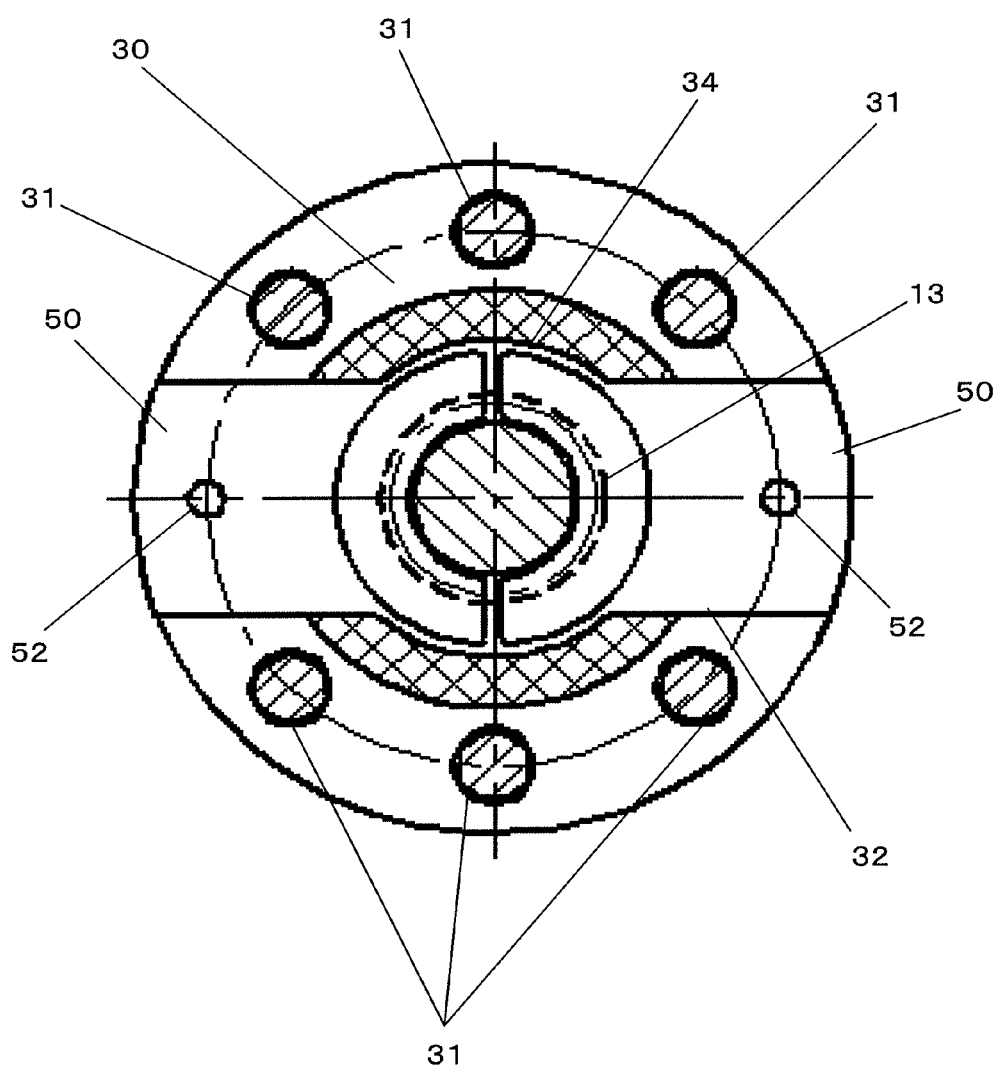
FIG. 17 is a drawing showing semicircular retainers which are generally used in prior art and mounted into the guide groove in the fixing bushing shown in FIG. 15.

Here, sections of the contact face between the retainers 50 and the screw driving portion 70 and seen in a direction facing the retainers are shown in FIGS. 16 and 17. In FIG. 16, the retainers shown in FIG. 1 are mounted into the guide groove in the fixing bushing shown in FIG. 15. In FIG. 17, the semicircular retainers used in general in the prior art are mounted into the guide groove in the fixing bushing shown in FIG. 15.

Because the cylindrical space 34 formed in the fixing bushing 30 has the outer diameter $\phi D$ greater than the width L of the guide groove 32 as described above, the semicircular retainers 50 can be used as far as they have outer diameters corresponding to the cylindrical space 34, since such retainers 50 do not drop off from the guide groove 32 even during operation of the screw. Although the fixing bushing 30 needs to be detached to mount and detach the screw in the case of the semicircular retainers, the semicircular retainers can be produced at low cost. Therefore, suitable retainers can be used according to workability in mounting and detaching the screw and costs of parts.

Because the guide groove 32 which is the engaging portion for the sliding of the retainers 50 is formed in the fixing bushing 30 in FIG. 15, the cylindrical space 34 is formed by an outer periphery of the screw 10 and an inner peripheral face of the fixing bushing 30. On the other hand, if the engaging portion (guide groove 32) for the sliding of the retainers 50 is formed in the screw driving portion 70, a cylindrical space corresponding to the cylindrical space 34 is formed by the outer periphery of the screw 10 and an inner peripheral face of the screw driving portion 70.

Although the fourth embodiment has been described as the embodiment having the same structure as the first embodiment, the same effect can be obtained in the above-described second and third embodiments by using the fixing bushing 30 in the same shape as in FIG. 15.

According to the invention, as in the four embodiments of the screw mounting structure of the invention, it is possible to provide the screw mounting structure in which the workability during replacement of the screw is satisfactory and which is adaptable to a small-sized screw driving portion in which retainers and a fixing bushing are used when mounting a screw to such a screw driving portion.

By contriving the shapes of the retainers, it is possible to achieve the screw mounting structure in which the retainers are prevented from dropping off when detaching the screw and the fixing bushing fixing bolts are less likely to interfere with the retainers even if the bolts increase in size or number.

The invention claimed is:

1. A screw mounting structure of an injection molding machine in which a screw is fixed to a screw driving portion which transmits a rotating force and forward and backward thrusts to the screw, wherein
an engaging groove is formed in an outer periphery of a base portion of the screw, and a retainer for restricting axial movement of the screw is engaged with the engaging groove, and
a fixing bushing for restricting movement of the screw in a rotating direction, having a hole through which the base portion of the screw is inserted and which has a key or a spline formed therein, is fixed to the screw driving portion, and
wherein a guide groove for allowing the retainer, provided in a direction orthogonal to a rotary axis of the screw, to slide is formed in the fixing bushing and/or the screw driving portion, and
a member for fixing the retainer, inserted through the guide groove, to the fixing bushing and a member for fixing the fixing bushing to the screw driving portion are provided to the fixing bushing.

2. The screw mounting structure of an injection molding machine according to claim 1, wherein an elongated hole or a notch is formed in the retainer, and movement of the retainer in a sliding direction in the guide groove is restricted by a bolt or a pin inserted through the elongated hole or the notch.

3. The screw mounting structure of an injection molding machine according to claim 2, wherein the bolt inserted through the elongated hole or the notch in the retainer is a bolt for fixing the fixing bushing to the screw driving portion.

4. The screw mounting structure of an injection molding machine according to claim 1, wherein a cylindrical space is formed on an outer side of the screw and between the screw and the fixing bushing or between the screw and the screw driving portion, and a width of the guide groove in the fixing bushing, in a direction orthogonal to the sliding direction of the retainer, is smaller than an outer diameter of the cylindrical space.

5. The screw mounting structure of an injection molding machine according to claim 2, wherein a cylindrical space is formed on an outer side of the screw and between the screw and the fixing bushing or between the screw and the screw driving portion, and a width of the guide groove in the fixing bushing, in a direction orthogonal to the sliding direction of the retainer, is smaller than an outer diameter of the cylindrical space.

* * * * *